United States Patent
Mosgrove

(10) Patent No.: US 6,928,503 B1
(45) Date of Patent: Aug. 9, 2005

(54) METHOD AND APPARATUS FOR ROBUST ADDRESSING ON A DYNAMICALLY CONFIGURABLE BUS

(75) Inventor: Ronald L. Mosgrove, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/095,032

(22) Filed: Jun. 10, 1998

Related U.S. Application Data

(63) Continuation-in-part of application No. 08/998,583, filed on Dec. 29, 1997, now Pat. No. 6,418,493.

(51) Int. Cl.[7] .............................................. G06F 13/00
(52) U.S. Cl. ......................... 710/302; 710/9; 710/104; 710/10
(58) Field of Search ........................ 710/8, 9, 10, 104, 710/105, 302, 305–317; 711/202–209

(56) References Cited

U.S. PATENT DOCUMENTS

| | | | |
|---|---|---|---|
| 4,730,251 A | | 3/1988 | Aakre et al. |
| 4,933,845 A | | 6/1990 | Hayes |
| 5,175,822 A | | 12/1992 | Dixon et al. |
| 5,367,640 A | | 11/1994 | Hamilton et al. |
| 5,493,656 A | | 2/1996 | Tsukamoto |
| 5,544,333 A | | 8/1996 | Frazier et al. |
| 5,628,027 A | | 5/1997 | Belmont |
| 5,664,221 A | | 9/1997 | Amberg et al. |
| 5,666,557 A | | 9/1997 | Cassidy et al. |
| 5,761,448 A | | 6/1998 | Adamson et al. |
| 5,761,455 A | | 6/1998 | King et al. |
| 5,764,911 A | * | 6/1998 | Tezuka et al. ............... 709/223 |
| 5,764,930 A | * | 6/1998 | Staats .......................... 710/107 |
| 5,825,752 A | * | 10/1998 | Fujimori et al. ............. 370/260 |
| 5,845,081 A | * | 12/1998 | Rangarajan et al. ......... 370/258 |
| 5,875,301 A | * | 2/1999 | Duckwall et al. ............... 710/8 |
| 5,941,956 A | * | 8/1999 | Shirakihara et al. ......... 709/200 |
| 5,949,785 A | * | 9/1999 | Beasley ....................... 370/398 |
| 5,978,854 A | * | 11/1999 | Fujimori et al. ............. 709/245 |
| 5,982,773 A | * | 11/1999 | Nishimura et al. ..... 370/395.53 |
| 6,026,354 A | * | 2/2000 | Singh et al. ................. 702/186 |
| 6,028,860 A | * | 2/2000 | Laubach et al. ........ 370/395.64 |
| 6,028,862 A | * | 2/2000 | Russell et al. ............... 370/397 |
| 6,038,625 A | * | 3/2000 | Ogino et al. ................. 710/104 |
| 6,061,349 A | * | 5/2000 | Coile et al. .................. 370/389 |
| 6,111,858 A | * | 8/2000 | Greaves et al. .............. 370/256 |
| 6,160,796 A | * | 12/2000 | Zou ............................ 370/257 |
| 6,202,169 B1 | * | 3/2001 | Razzaghe-Ashrafi et al. .. 714/1 |
| 6,219,697 B1 | * | 4/2001 | Lawande et al. ............ 709/220 |
| 6,266,335 B1 | * | 7/2001 | Bhaskaran ................... 370/389 |

OTHER PUBLICATIONS

U.S. Appl. No. 08/998,583, filed Dec. 29, 1997, entitled Method and Apparatus for Robust Addressing on a Dynamically Configurable bus, by Ronald L. Mosgrove.

* cited by examiner

*Primary Examiner*—Glenn A. Auve
(74) *Attorney, Agent, or Firm*—Erik M. Metzger

(57) ABSTRACT

A bus system comprises a bus, a first bus device on the bus at a first virtual address and at a first physical address on the bus, and a second bus device on the bus at a second virtual address and a second physical address. The bus system further comprises a map of the first and second virtual addresses to the first and second physical addresses, respectively, encoded on a program storage medium. The map is accessible over the bus. The first and second virtual addresses may each be, for example, a guaranteed unique identifier (GUID).

46 Claims, 6 Drawing Sheets

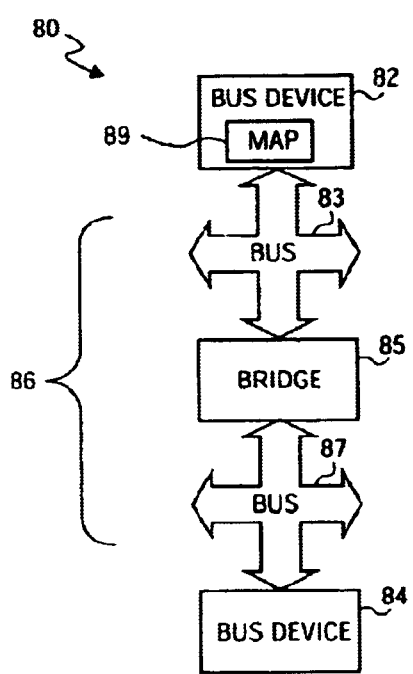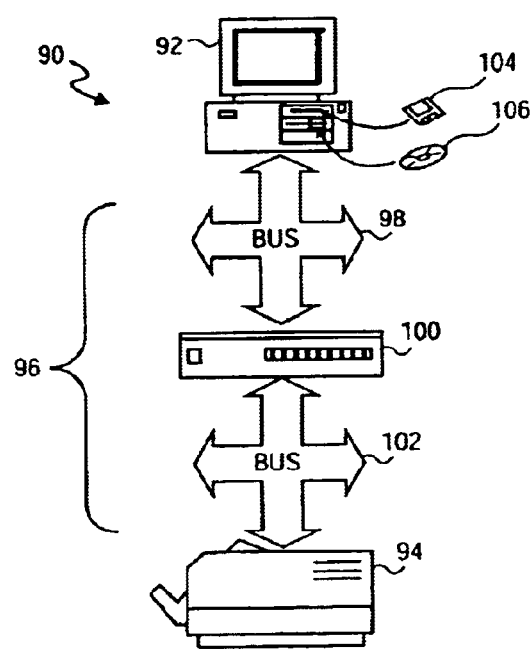
FIG. 10
FIG. 12

METHOD AND APPARATUS FOR ROBUST ADDRESSING ON A DYNAMICALLY CONFIGURABLE BUS

This application is a continuation-in-part of my application Ser. No. 08/998,583, entitled "Method and Apparatus for Robust Addressing on a Dynamically Configurable Bus," filed Dec. 29, 1997 now U.S. Pat. No. 6,418,493, from which I claim the benefit of an earlier effective filing date for all common subject matter.

BACKGROUND OF THE INVENTION

1. Field of the Invention

This invention relates generally to bus systems and, more particularly, to robust addressing on a dynamically configurable bus.

2. Description of the Related Art

A "bus" is a group of transmission media used to pass information from one location to another. One type of bus is a collection of wires used to transmit data and control information to the various internal components of a computer. Another type of bus is a collection of wires, fibers, or cables, used to transmit data and control information between "bus devices" such as computers, printers, and magnetic tape drives. As used herein, the term "bus" shall refer to the latter type of bus.

The bus devices and the bus comprise a "bus system." Exemplary applications for bus systems include universal serial bus ("USB") systems and Ethernet local area networks ("LANs") that, in turn, might comprise part of larger wide area networks ("WANs"). A bus may be used to implement a LAN, but not all bus systems are actual computer networks in the sense of a LAN. An bus system might simply be a group of devices on a bus wherein the bus is a channel among the devices. Thus, the term "bus system" as used herein shall encompass a group of bus devices transmitting and/or receiving information over a bus. The definition may encompass a LAN depending on the particular implementation.

A bus system, therefore, typically includes a bus to which several bus devices are coupled. Each bus device has a physical address on the bus at which it receives and/or from which it transmits information over the bus. Thus, a computer may transmit information over the bus from its physical address to a shared printer at the printer's physical address, provided both are part of the same bus system.

Historically, every bus device had a predetermined, unique, physical address on the bus to prevent confusion during information transmission. Because the physical address was predetermined and static, a device could assume that a particular device was, in fact, located at that address. In the recited example, the computer could send the information to the printer at the printer's assigned physical address confident that only the printer would receive or respond because only the printer would reside at the assigned physical address.

However, the use of physical addressing imposed certain constraints on bus system design. These constraints were eventually overcome using a technique known as "virtual addressing." Under this approach, a bus device operates on the bus using its "virtual address," which is associated with, but typically different from, its physical address. Virtual addressing nevertheless created a serious addressing problem: a device could no longer assume the presence or absence of another device from its virtual address because it differed from the device's physical address.

Typically, when a device wishes to communicate with another device over a virtually addressed bus, the communicating bus device at some point queries all the other bus devices until it finds the one with which it wishes to communicate. More particularly, the querying, device accesses the bus one or more times to examine the configuration information for each device encountered. The querying device determines from the configuration information whether the encountered device is the one sought. If so, the physical address is retrieved and the communication conducted. Otherwise, the querying device continues on to the next bus device until it locates the desired bus device.

This propagation of addressing information requires substantial overhead, burdens the bus system and consumes system resources that otherwise might be used more productively. In addition, the propagation of addressing information potentially produces user visible delays or interruption of services. Thus, although this approach works satisfactorily with small numbers of bus devices, it is unduly burdensome for large bus systems.

The overhead problem is exacerbated when the dynamic bus system includes power-managed bus devices. A power-managed device switches to a "sleep" state to reduce power consumption after a predetermined period of nonuse. Many bus devices have limited capabilities for tracking certain events in the reconfiguration in dynamically configurable bus systems. The difficulty arises when the dynamic bus system is reconfigured and a device of this type is in the sleep state. Such devices cannot track dynamic events in the sleep state and must be awakened to do so, thereby hampering power management.

The present invention is directed to overcoming, or at least reducing the effects of, one or more of the problems set forth above.

SUMMARY OF THE INVENTION

The invention, in one particular embodiment is a bus system, comprising a dynamically configurable bus, a first bus device on the bus at a first virtual address and at a first physical address on the bus, and a second bus device on the bus at a second virtual address and a second physical address. The bus system further comprises a map of the first and second virtual addresses to the first and second physical addresses, respectively, encoded on a program storage medium, the map being accessible over the bus.

BRIEF DESCRIPTION OF THE DRAWINGS

Other objects and advantages of the invention will become apparent upon reading the following detailed description and upon reference to the drawings in which:

FIG. 10 illustrates a third embodiment of the invention, the embodiment being a bus system including two separate buses coupled by a bridge;

FIG. 12 depicts one particular embodiment of the bus system of FIG. 10.

Figure 1:
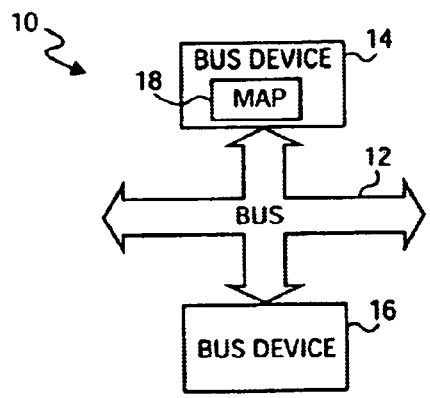
FIG. 1 illustrates a first embodiment of a bus system constructed and operated in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

FIG. 1 illustrates a bus system 10 constructed and operated in accordance with a first embodiment of the invention. The system 10 generally comprises a dynamically configurable bus 12, a first bus device 14, and a second bus device 16. The first bus device 14 and the second bus device 16 may be coupled to the bus 12 in a conventional manner. The first bus device 14 includes a map 18, whose structure and function are set forth in more detail below.

The bus 12 may be any type of dynamically configurable bus and, in various alternative embodiments, may comprise multiple buses. The bus 12 may, in some embodiments, implement a LAN or part of a WAN (not shown). The bus 12 may, therefore, be any medium suitable for a particular implementation such as a twisted wire pair, a coaxial cable, or an optical fiber. The bus 12 may operate in accord with any number of standards or protocols known to the art for this purpose, provided modifications are made to implement the invention as set forth below.

The first bus device 14 may be any one of a number of bus device types appropriately programmed and as are known in the art. For instance, the first bus device 14 may be an appropriately programmed personal computer or workstation in various alternative embodiments. The first bus device 14 has a memory subsystem (not shown) that includes some form of program storage device such as a random access memory ("RAM"), a hard disk, a floppy disk, or an optical disk. Some embodiments of the first bus device 14 might have more than one program storage device.

The first bus device 14 constructs and maintains the address map 18. The address map 18 maps a virtual address for each bus device to the respective physical address for that bus device. Virtual addressing is well known in the art. Before communication may be established, the physical address associated with the virtual address must be ascertained. Thus, a virtual address is assigned to each of the first bus device 14 and the second bus device 16 in a manner known to the art. In the embodiment illustrated, the map 18 maps the virtual addresses of the first bus device 14 and the second bus device 16 to their respective physical addresses on the bus system 10. The map 18 is bi-directional so that a physical address may be located from a virtual address and a virtual address can be located from a physical address.

The map 18 may be implemented as a data structure encoded on some form of random access memory (not shown) such as an optical disk, a hard disk or a floppy disk. Many suitable data structures are known to the art. For instance, the map 18 may be implemented as any type of storage mechanism, such as an array, a doubly linked list, a tree, a table, or a simple file, provided the structure suitably enables the bi-directional determination of virtual addresses and physical addresses. The particular structure with which the map 18 is implemented is not material to the practice of the invention, although some particular implementations might favor one structure over another.

In some embodiments, the map 18 will be implemented by an "address manager." The address manager may be a software application resident on some program storage medium associated with the first bus device 14. For instance, the address manager may comprise computer readable instructions encoded on a program storage medium (not shown) such as a random access memory, a hard disk, a floppy disk, or an optical disk. The address manager, in such embodiments, would gather the necessary information and create the data structure that comprises the map 18.

The map 18 is shown resident on the first bus device 14 in FIG. 1. Although this has many advantages, it is not necessary to the practice of the invention. The map 18 may be stored on any bus device having suitable capabilities that may be accessed over the bus 12. The entire map 18 also need not be resident on a single bus device, but may be distributed across a plurality of bus devices in some embodiments.

Figure 2:
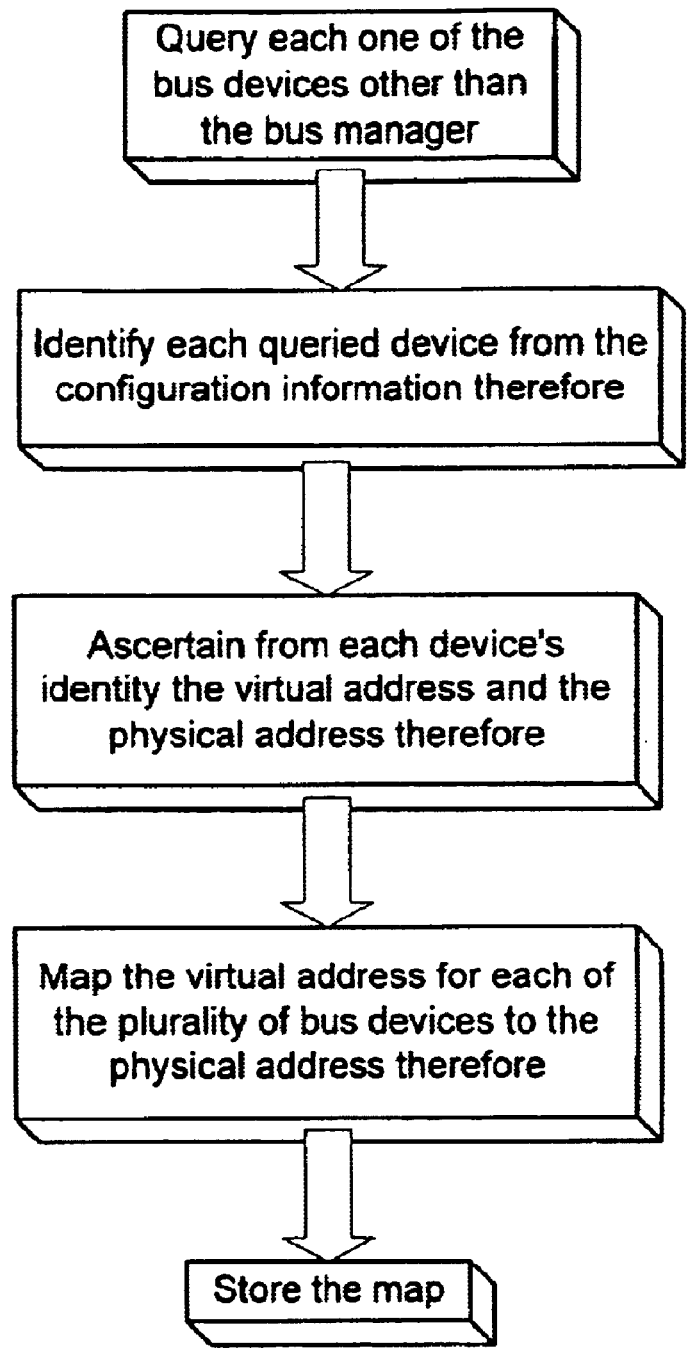
FIG. 2 illustrates a method for operating the bus system of FIG. 1 in accordance with the particular embodiment of the invention therein.

FIG. 2 illustrates one embodiment of a method performed in accordance with the present invention. The method of FIG. 2 is performed whenever a "configuration event" occurs on the bus system 10. On virtually addressed buses, only certain activities may cause addresses to change. These activities will be called "configuration events."

Figure 3:
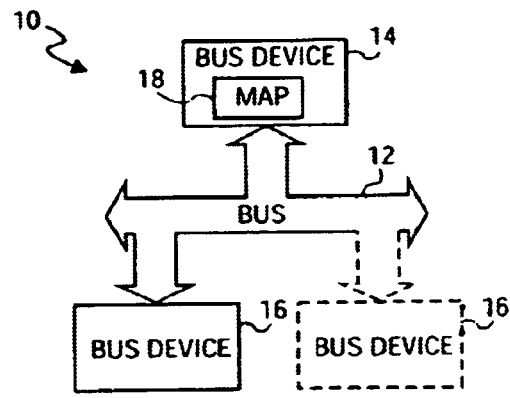
FIG. 3 illustrates a change in configuration of the bus system in FIG. 1 such as might trigger the method of FIG. 2.

Configuration events such as powering on a bus, resetting a bus, insertion or removal of a device or any other event defined by the protocols appropriate for the bus implementation that may cause physical addresses to change. Configuration events are typically well known so that affected devices have the capability to detect that the configuration event has occurred. Physical addresses are static between configuration events, configuration events being the occasions on which the map 18 is generated and stored. Referring now to FIG. 3, a third bus device 19 is illustrated in ghosted lines, indicating its insertion into or removal from the bus system 10. Any such insertion or removal will cause a configuration event on the bus system 10. Any configuration event will invoke the method of FIG. 2.

Referring to both FIG. 2 and FIG. 3, the method begins by querying, upon detection of a configuration event, each one of the bus devices 16 and 19 other than the first bus device 14 and determining the identity of each queried bus device 16 and 19 from their configuration information. Each bus device 14, 16, and 19 has a virtual address and a physical address assigned to it in the manner customarily used in the art. From the device's identity, the first bus device 14 ascertains the virtual address and the physical address for the devices 16 and 19. The first bus device 14 then maps the virtual address for each of the bus devices 16 and 19 to the physical address therefore. This map 18 is then stored and can then be used whenever any bus device 14, 16, or 19 wishes to transmit to another over the bus 12.

As will be apparent to those skilled in the art having the benefit of this disclosure, the invention is particularly suited to address the problems earlier mentioned. The construction and maintenance of the map alleviates the need to propagate physical addressing information as a bus device may simply access the map. Individual devices furthermore are relieved of the necessity to constantly track all dynamic events in lieu of the mapping activities. Thus, sleeping bus devices may continue to sleep through dynamic events. Still other advantages may accrue through use of the invention.

Figure 4:
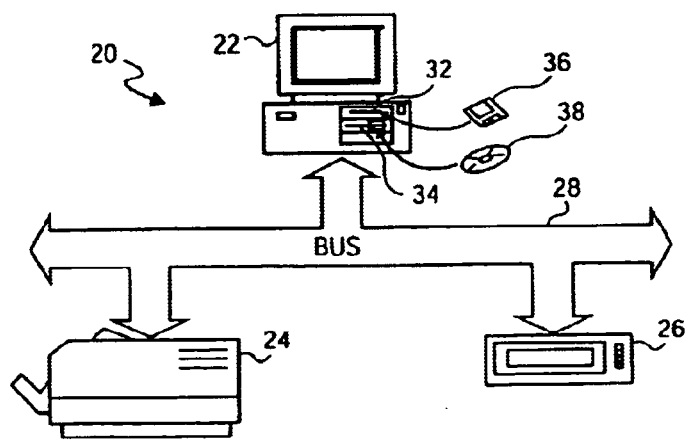
FIG. 4 illustrates one particular embodiment of the bus system in FIG. 3.

FIG. 4 depicts a bus system 20 that is one particular embodiment of the bus system 10 in FIG. 1. The bus system 20 includes a workstation 22, a printer 24, and a magnetic tape drive 26, all electrically coupled to a dynamically configurable bus 28. The term "workstation" is used herein in both a specific and a general sense. Specifically, the workstation 22 is a workstation in the sense of a dedicated, applications oriented computer with high resolution graphics capability. However, in embodiments where the bus system 20 implements a LAN, the workstation 22 may be a workstation in the sense of a single-user computer on the LAN. In the particular embodiment illustrated, the dynamically configurable bus 28 implements a network that may be a LAN or part of a WAN (not shown).

The workstation 22 is appropriately programmed and includes a floppy disk drive 32 and an optical disk drive 34 into which a floppy disk 36 and an optical disk 38, respectively, may be inserted. The memory subsystem of the workstation 22 also includes a hard disk (not shown) and RAM (also not shown). The floppy disk 36 is a program storage device on which the map 18, shown in FIG. 1, may be stored once constructed. The optical disk 38 is a program storage device on which the instructions for implementing the invention may be stored.

The workstation 22 constructs and maintains the address map, which may be encoded on any part of the memory subsystem discussed above. The address map maps a virtual address for each bus device 24, 26 to the respective physical address for that bus device. The particular virtual address for each bus device in this embodiment is the device's "guaranteed unique identifier." GUIDs and their use are well known in the art and, in addition to being unique, are guaranteed to be constant. GUIDs are typically installed by the manufacturer and never changed afterward.

The printer 24 and the magnetic tape drive 26 are merely representative bus devices. Other types of bus devices, such as a video camera, may be employed in other embodiments. In the embodiment of FIG. 4, neither the printer 24 nor the magnetic tape drive 26 has the capability to manage the bus 28, although the workstation 22 does. However, this is not necessary to the practice of the invention and such capability need not be employed in all embodiments.

Before communication may be established with a bus device, the physical address associated with the virtual address must be ascertained. Thus, a virtual address is assigned to each of the workstation 22, the printer 24, and the magnetic tape drive 26 in a manner known to the art. In the embodiment illustrated, the map maps the virtual addresses of the workstation 22, the printer 24, and the magnetic tape drive 26 to their respective physical addresses on the bus system 20. The map is bidirectional so that a physical address may be located from a virtual address and a virtual address can be located from a physical address.

The map may be implemented as a data structure encoded on some form of random access memory such as the hard disk (not shown) and the floppy disk 36. The map may be implemented using any type of data storage technique, such as an array, a doubly linked list, a tree, a table, or a simple file, provided the structure suitably enables the bidirectional determination of virtual addresses and physical addresses. In this particular embodiment, the map is implemented by an address manager resident on the hard disk of the workstation 22. The address manager gathers the necessary information and creates the data structure that comprises the map.

Referring to both FIG. 2 and FIG. 4, the method begins by querying, upon detection of a configuration event, each one of the bus devices, i.e., workstation 22, printer 24, and magnetic tape drive 26 is queried to determine the identity of each queried bus device 24 and 26. Each bus device 22, 24, and 26 has a virtual address and a physical address assigned to it in the manner customarily used in the art. From the device's identity, the workstation 22 ascertains the virtual address and the physical address for the devices 24 and 26. The workstation 22 then maps the virtual address for each of the bus devices 24 and 26 to the physical address therefore. This map 18 is then stored and can then be used whenever any bus device 22, 24, or 26 wishes to transmit to another over the bus 12.

Figure 5:
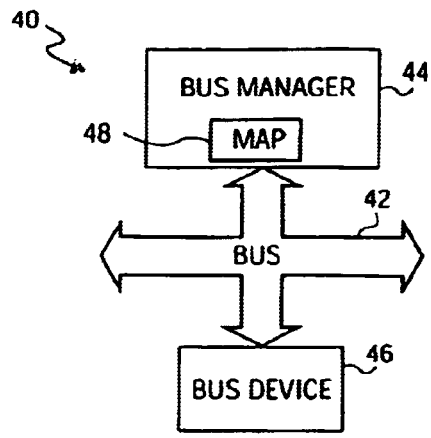
FIG. 5 illustrates a second embodiment of the invention, the embodiment being a dynamically configurable bus system including a bus manager.

The invention may also, in some alternative embodiments, be employed in a dynamically configurable bus system including a bus manager. FIG. 5 illustrates a dynamically configurable bus system 40 including a bus manager. The system 40 generally comprises a dynamically configurable bus 42, a bus device 44 operating as a bus manager, and a bus device 46. The bus manager 44 and the bus device 46 are coupled to the dynamically configurable bus 42 in a conventional manner. The map 48 resides on the bus manager 44, whose structure and function are set forth in more detail below.

The dynamically configurable bus 42 may be any type of bus and may, in some embodiments, implement a LAN or part of a WAN (not shown). The dynamically configurable bus 42 may, therefore, be any medium suitable for a particular implementation such as a twisted wire pair, a coaxial cable, or an optical fiber. The bus may operate in accord with any number of standards or protocols known to the art for this purpose, provided modifications, are made to implement the invention as set forth below.

The bus manager 44 manages the bus, performing arbitration, allocation, and control as defined in the standards and protocols known to the art for this purpose and appropriate for the specific implementation. The bus manager 44 may be any of a number of bus device types appropriately programmed for this function and as are known in the art. For instance, the bus manager 44 may be an appropriately programmed personal computer or workstation in various alternative embodiments. The bus manager 44 has a memory subsystem (not shown) that includes some form of program storage device such as a random access memory ("RAM"), a hard disk, a floppy disk, or an optical disk. Some embodiments of the bus manager 44 might have more than one program storage device.

The bus manager 44 constructs and maintains the address map 48. The address map 48 maps a virtual address for each bus device to the respective physical address for that bus device. The virtual address for any given bus device 44 or 46 in this particular embodiments is also its GUID. A GUID is assigned to each of the bus manager 44 and the bus device 46 in a manner known to the art. In the embodiment illustrated, the map 48 maps the GUIDs of the bus manager 44 and the bus device 46 to their respective physical addresses on the dynamic bus system 40. The map 48 is bi-directional so that a physical address may be located from a GUID and a GUID can be located from a physical address.

The map 48 may be implemented as a data structure encoded on some form of random access memory such as a hard disk or a floppy disk. Many suitable data structures are known to the art. For instance, the map 48 may be implemented as any type of storage mechanism, such as an array, a doubly linked list, a tree, a table, or a simple file, provided the structure suitably enables the bidirectional determination of GUIDs and physical addresses. The particular structure with which the map 48 is implemented is not material to the practice of the invention, although some particular implementations might favor one structure over another.

In some embodiments, the map 48 will be implemented by an "address manager." The address manager may be a software application resident on some program storage medium associated with the bus manager 44. For instance, the address manager may comprise computer readable instructions encoded on a program storage medium (not shown) such as a random access memory, a hard disk, a floppy disk, or an optical disk. The address manager, in such embodiments, would gather the necessary information and create the data structure that comprises the map 48.

The map 48 is shown resident on the bus manager 44 in FIG. 5. Although this has many advantages, it is not necessary to the practice of the invention. The map 48 may be stored on another bus device, such as an external hard disk (not shown), that may be accessed over the dynamically configurable bus 42. Similarly, in embodiments employing an address manager, the address manager may advantageously be employed resident on the bus manager 44. The invention nevertheless contemplates that an address manager might be resident on another bus device from which it may be invoked over the dynamically configurable bus 42 upon power-on or reset.

Figure 7:
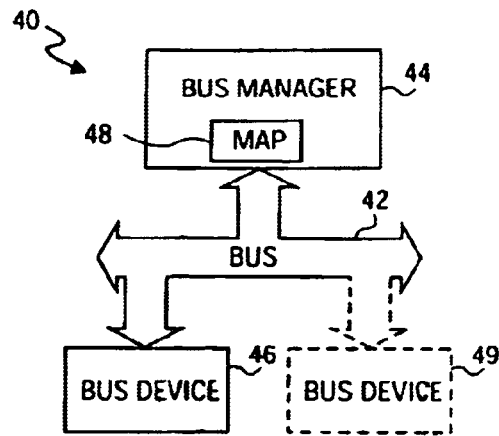
FIG. 7 depicts the insertion or removal of a bus device from the dynamic bus system of FIG. 5.
Figure 6:
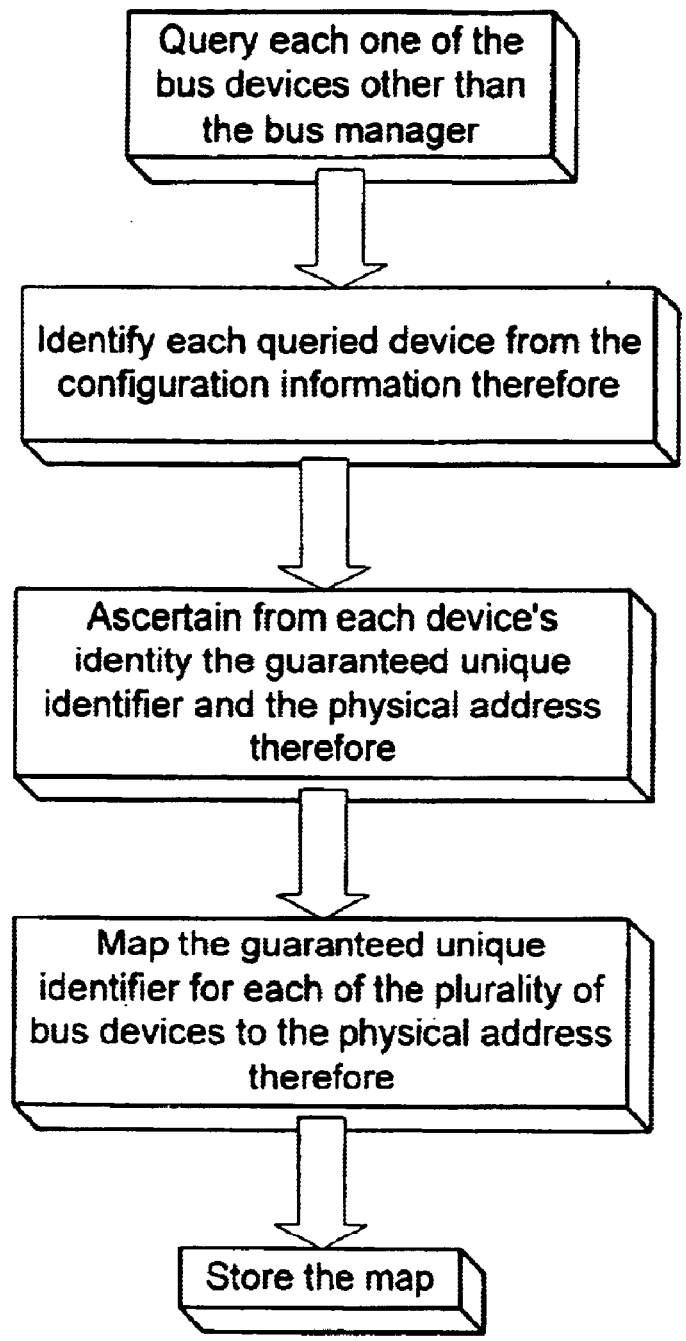
FIG. 6 illustrates one embodiment of a method as may be employed by the dynamically configurable bus system of FIG. 5 in accordance with the present invention.

FIG. 6 illustrates one embodiment of a method performed in accordance with the present invention. The method of FIG. 6 is performed whenever a configuration event, as earlier described, occurs on the bus system 40, configuration events being the occasions on which the map 48 is generated and stored. Referring now to FIG. 7, a bus device 49 is illustrated in ghosted lines, indicating its insertion into or removal from the bus system 40. Any such insertion or removal will cause a configuration event on the bus system 40. Any configuration event will invoke the method of FIG. 6.

Referring to both FIG. 6 and FIG. 7, the method begins by querying, upon detection of a configuration event, each one of the bus devices 46 and 49 other than the bus manager 44 and determining the identity of each queried device 46 and 49 from their configuration information. Each device 44, 46, and 49 has a GUID and a physical address assigned to it in the manner customarily used in the art. From the device's identity, the bus manager 44 ascertains the GUID and the physical address for the devices 46 and 49. The bus manager 44 then maps the GUID for each of the bus devices 46 and 49 to the physical address therefore. This map 48 is then stored and can then be used whenever any bus device 44, 46, or 49 wishes to transmit to another over the dynamically configurable bus 42.

Figure 8:
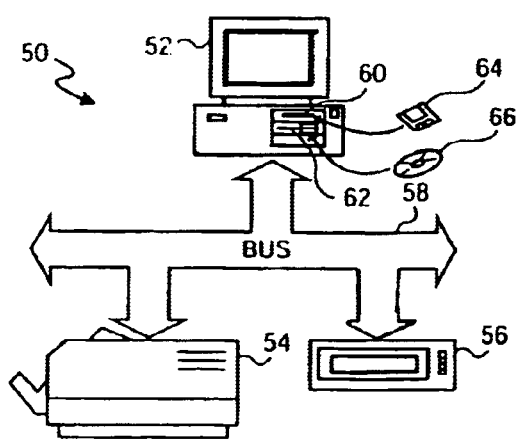
FIG. 8 depicts one particular embodiment of the dynamic bus system illustrated in FIG. 7.

FIG. 8 depicts a dynamically configurable bus system 50 that is one particular embodiment of the bus system 40 in FIG. 5. The bus system 50 includes a workstation 52, a printer 54, and a magnetic tape drive 56, all electrically coupled to a dynamic bus 58. The workstation 52 acts as the bus manager in this particular embodiment. The workstation 52 includes a floppy disk drive 60 and an optical disk drive 62 into which a floppy disk 64 and an optical disk 66, respectively, may be inserted. The floppy disk 64 is a program storage device on which the map 48, shown in FIG. 5, may be stored. The optical disk 66 is a program storage device on which the instructions for implementing the invention may be stored. The printer 54 and the magnetic tape drive 56 are merely representative bus devices and other types of bus devices may be employed.

Referring to both FIG. 6 and FIG. 8, the method begins by querying, upon detection of a configuration event, each one of the bus devices 54 and 56 other than the bus manager 52 and determining the identity of each queried bus device 54 and 56 from their configuration information. Each bus device 52, 54, and 56 has a virtual address and a physical address assigned to it in the manner customarily used in the art. From the device's identity, the bus manager 52 ascertains the virtual address and the physical address for the devices 54 and 56. The bus manager 52 then maps the virtual address for each of the bus devices 54 and 56 to the physical address therefore. This map is then stored and can then be used whenever any bus device 52, 54, or 56 wishes to transmit to another over the bus 58.

Figure 9:
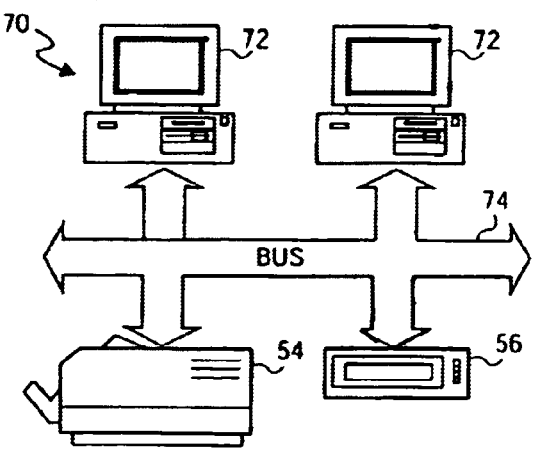
FIG. 9 illustrates a second particular embodiment of the dynamically configurable bus system of FIG. 7 including a second bus manager.

FIG. 9 illustrates a particular embodiment in which a dynamic bus system 70 includes two potential bus managers 72. Each of the potential bus managers 72 is a workstation such as the workstation 52 in FIG. 8. The two workstations 72 in FIG. 9 may each have the ability to be a bus manager, but only one may be bus manager at any given time. As will be appreciated by those skilled in the art having the benefit of this disclosure, the two workstations 72 will arbitrate each time the bus system 70 is reset or powered on to determine which will be the bus manager. The designated bus manager then remains bus manager until the next power-on or reset, at which time the workstations 72 re-arbitrate. The bus system 70 in FIG. 9 otherwise operates in a manner analogous to that of the embodiments in FIGS. 5–7.

The invention may also, in alternative embodiments, be employed in bus systems employing multiple buses. FIG. 10 illustrates such a bus system 80. The bus system 80 includes a first bus device 82 on a bus 86 with a second bus device 84. The bus 86 comprises two buses 83 and 84 physically coupled by bridge 85 in a conventional manner. The map 89 is shown residing on the first bus device 82. However, the first bus device 82, second bus device 84, and the map 89 are subject to all the variations disclosed relative to the alternative embodiments discussed above. Thus, one or more of the bus devices 82 and 84 may be a bus manager, but neither has to be. Similarly, the map 89 may reside on either of the bus devices 82 and 84 or the bridge 85, or be distributed among them.

The principle difference in the operation of the bus system 80 relative to other bus systems discussed above is that configuration events may occur on either of the buses 83 and 87. Thus, the map 89 might need to be constructed for events occurring on a bus to which the bus device 82 is directly coupled. The nature of these configuration events will be implementation specific since many variations on the coupled-bus embodiment of FIG. 10 are possible. These variations and the associated configurations events will be readily apparent to those skilled in the art having the benefit of this disclosure.

Note, however, that the map 89 would need to be constructed only for the bus 83 or 87 experiencing the configuration event. For example, if bus device 84 were removed from the bus 86, and more particularly bus 84, the map 89 would only need to be reconstructed for those bus devices on the bus 87. The map 89 could remain unaltered for the bus devices on the bus 83. Alternatively, the map 89 may be reconstructed for the entire bus 86 upon detecting a reconfiguration event on either of the buses 83 and 87.

Figure 11:
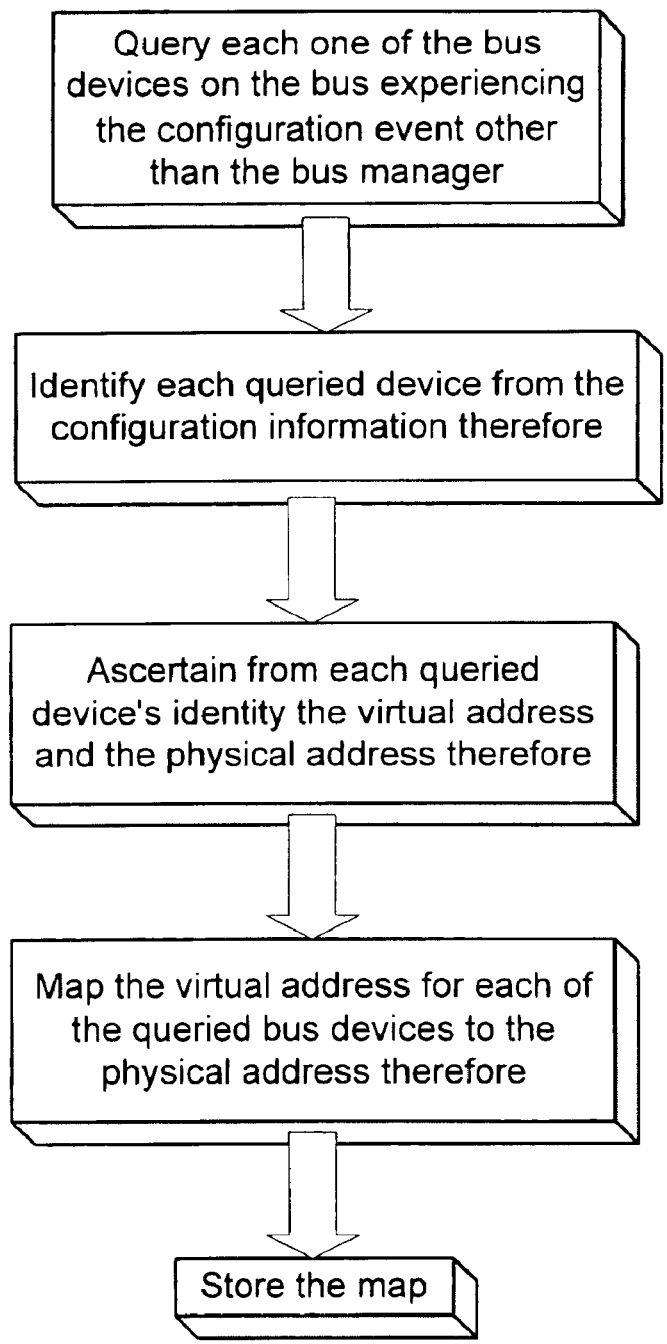
FIG. 11 illustrates a method as may be performed by the embodiment of FIG. 10 in accordance with the present invention.

FIG. 11 illustrates one embodiment of a method performed in accordance with the present invention. The method of FIG. 2 is performed whenever a "configuration event" occurs on the bus system 80, regardless of whether such configuration event occurs on bus 83 or bus 87. Some configuration events might affect both buses 83 and 87; for example, a power on of the bus system 86. However, for the sake of clarity, the method of FIG. 11 shall be discussed assuming a configuration event on the buses 87. Application of the method 11 to a configuration event affecting bus 83 only or both buses 83 and 87 will be readily extrapolated from the discussion below by those skilled in the art having the benefit of this disclosure.

Referring to both FIG. 10 and FIG. 11, the method is invoked by the detection of a configuration event on either of the buses 83 and 87. Upon such detection, the method of FIG. 11 begins by querying each one of the bus devices 85 and 84 other than the first bus device 82 on the bus experiencing the configuration event. Next, the identity of each queried bus device 84 and 85 is determined from their configuration information. Each bus device 82, 84, and 85 has a virtual address and a previously physical address assigned to it in the manner customarily used in the art. From the device's identity, the first bus device 82 ascertains the virtual address and the physical address for the queried devices 84 and 85. The first bus device 82 then maps the virtual address for each of the queried bus devices 84 and 85 to the physical address therefore. This map 89 is then stored and can then be used whenever any bus device 82, 84, or 85 wishes to transmit to another over the bus 86.

FIG. 12 illustrates bus system 90, which is one particular embodiment of the bus system 80 of FIG. 10. The bus system 90 includes a workstation 92 and a printer 94 coupled to a bus 96. The bus 96 includes a first bus 98 coupled by a bridge 100 to a second bus 102. The workstation 92 includes a memory subsystem including a hard disk (not shown), RAM (not shown), a floppy disk 104, and an optical disk 106. As with other embodiments discussed above, the hard drive, floppy disk 104, and the optical disk 106 may be encoded with instructions for executing the method of the invention in its various alternative embodiments. Note, however, that the bridge 100 will have a virtual address and a physical address that will need to be mapped.

Referring now to both FIG. 10 and FIG. 11, the method is invoked by the detection of a configuration event on either of the buses 98 and 102. Again, for the sake of clarity, the method of FIG. 11 shall be discussed assuming a configuration event on the buses 102. Upon such detection, the method of FIG. 11 begins by querying each one of the bus devices 100 and 94 other than the first bus device 92 on the bus 102 experiencing the configuration event. Next, the identity of each queried bus device 94 and 100 is determined from their configuration information. Each bus device 92, 94, and 100 has a virtual address and a previously physical address assigned to it in the manner customarily used in the art. From the device's identity, the first bus device 92 ascertains the virtual address and the physical address for the queried devices 94 and 100. The first bus device 92 then maps the virtual address for each of the queried bus devices 94 and 100 to the physical address therefore. This map 89 is then stored and can then be used whenever any bus device 92, 94, or 100 wishes to transmit to another over the bus 96.

Thus, the particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A bus system, comprising:

a first dynamically configurable bus;

a first bus device on the first bus to operate at a first power state and having a first virtual address and a first physical address;

a second bus device on the first bus having a second virtual address and a second physical address, the second bus device to experience a configuration event without the configuration event affecting the first power state of the first bus device;

a map of the first and second virtual addresses to the first and second physical addresses, respectively, the map to be accessible over the first bus;

wherein at least one of the first and second virtual addresses is a guaranteed unique identifier.

2. The bus system of claim 1, wherein the map is to be distributed across a plurality of bus devices on the first bus.

3. The bus system of claim 1, wherein at least one of the first and second bus devices is a bus manager.

4. The bus system of claim 3, wherein the bus manager is one of a workstation and a personal computer.

5. The bus system of claim 3, wherein a portion of the map is stored on the bus manager.

6. The bus system of claim 1, wherein the bus system implements a network.

7. The bus system of claim 1, wherein at least one of the first and second bus devices is one of a printer, a plotter, a workstation, a personal computer, a video camera, and a magnetic tape drive.

8. The bus system of claim 1, wherein the map is encoded as one of an array, a doubly linked list, a tree, a table, and a file.

9. The bus system of claim 1, wherein the map is bi-directional.

10. The bus system of claim 1, further comprising a second dynamically configurable bus.

11. The bus system of claim 10, wherein the first and second buses are coupled by a bridge.

12. The bus system of claim 11, wherein a portion of the map is stored on the bridge.

13. A bus system, comprising:
a first dynamically configurable bus;
a plurality of bus devices coupled to the first bus, each of the plurality of bus devices having a virtual address, a physical address, and a power state, at least one of the plurality of bus devices to experience a configuration event without the configuration event affecting the power state of the bus devices that are not to experience the configuration event; and
a map of the virtual addresses of the bus devices, said map to be accessible over the first bus;
wherein at least one virtual address is a guaranteed unique identifier.

14. The bus system of claim 13, wherein said map is to be distributed across the plurality of bus devices.

15. The bus system of claim 13, wherein at least one of the bus devices is a bus manager.

16. The bus system of claim 15, wherein the bus manager is one of a workstation and a personal computer.

17. The bus system of claim 15, wherein a portion of the map is stored on the bus manager.

18. The bus system of claim 13, wherein the bus system implements a network.

19. The bus system of claim 13, wherein at least one of the bus devices is one of a printer, a plotter, a workstation, a personal computer, a video camera, and a magnetic tape drive.

20. The bus system of claim 13, wherein the map is encoded as one of an array, a doubly linked list, a tree, a table, and a file.

21. The bus system of claim 13, wherein the map is bi-directional.

22. The bus system of claim 13, further comprising a second dynamically configurable bus.

23. The bus system of claim 22, wherein the map is to be reconstructed for bus devices on the first and second buses after detection of a configuration event on one of the first and second buses.

24. The bus system of claim 22, wherein the first and second buses are coupled by a bridge.

25. The bus system of claim 24, wherein a portion of the map is stored on the bridge.

26. The bus system of claim 23, wherein the map is to be reconstructed for bus devices on one of the first and second buses after experiencing a configuration event.

27. A method comprising:
querying a first bus device and a second bus device other than a bus manager on a dynamically configurable bus system;
identifying the queried device from its configuration information;
ascertaining a virtual address and a physical address for the identified device;
constructing a map of the virtual address of the first and the second bus device to the physical address of the first and the second bus device, respectively, the physical address being a guaranteed unique identifier, the querying, identifying, ascertaining and constructing being able to be performed without affecting a power state of the first bus device and the second bus device; and
storing the map, said map to be accessible over the bus system.

28. The method of claim 27, wherein the constructing the map includes encoding the map as one of an array, a doubly linked list, a tree, a table, and a file.

29. The method of claim 27, wherein the dynamically configurable bus system includes a first dynamically configurable bus and a second dynamically configurable bus and the querying is performed for bus devices on one of the first and second dynamically configurable buses experiencing a configuration event.

30. The method of claim 27, wherein the constructing the map includes constructing a bi-directional map.

31. The method of claim 27, wherein the map is distributed across a plurality of bus devices on the bus system.

32. The method of claim 27, wherein the storing the map includes storing a portion of the map on the bus manager.

33. A method comprising:
querying a plurality of bus devices other than a bus manager on a dynamically configurable bus system;
identifying the queried device from its configuration information;
ascertaining a virtual address and a physical address for the identified device, the physical address being a guaranteed unique identifier;
constructing a map of the virtual address for each of the plurality of bus devices to the physical address for each of the plurality of bus devices, the querying, identifying, ascertaining, and constructing being able to be performed without affecting a power state of the first bus device and the second bus device; and
storing the map, said map to be accessible over the bus system and to be distributed across the plurality of bus devices on the bus system.

34. The method of claim 33, wherein the querying the plurality of bus devices includes querying at least one of a printer, a plotter, a workstation, a personal computer, a video camera, and a magnetic tape drive.

35. The method of claim 33, wherein the bus manager comprises one of a workstation and a personal computer.

36. The method of claim 33, wherein the storing the map includes storing a portion of the map on the bus manager.

37. The method of claim 33, wherein the constructing the map includes encoding the map as one of an array, a doubly linked list, a tree, a table, and a file.

38. The method of claim 33, wherein the constructing the map includes constructing a bi-directional map.

39. The method of claim 33, wherein the dynamically configurable bus system includes a first dynamically configurable bus and a second dynamically configurable bus and the querying is performed for bus devices on one of a first and second dynamically configurable bus experiencing a configuration event.

40. A machine-readable medium to store instructions, which when executed by a machine, cause the machine to perform operations comprising:
querying a plurality of bus devices other than a bus manager on a dynamically configurable bus system;
identifying the queried device from its configuration information;
ascertaining a virtual address and a physical address for the identified device, the physical address being a guaranteed unique identifier;
constructing a map of the virtual address for each of the plurality of bus devices to the physical address for each of the plurality of bus devices, the querying, identifying, ascertaining, and constructing being able to be performed without affecting a power state of the first bus device and the second bus device; and storing the map, said map to be accessible over the bus system and to be distributed across the plurality of bus devices on the bus system.

41. The machine-readable medium of claim 40, wherein the querying the plurality of bus devices includes querying at least one of a printer, a plotter, a workstation, a personal computer, a video camera, and a magnetic tape drive.

42. The machine readable medium of claim 40, wherein the bus manager is one of a workstation and a personal computer.

43. The machine-readable medium of claim 40, wherein the storing the map includes storing a portion of the map on the bus manager.

44. The machine-readable medium of claim 40, wherein the constructing the map includes encoding the map as one of an array, a doubly linked list, a tree, a table, and a file.

45. The machine-readable medium of claim 40, wherein the constructing the map includes constructing a bi-directional map.

46. The machine-readable medium of claim 40, wherein the dynamically configurable bus system includes a first dynamically configurable bus and a second dynamically configurable bus and the querying is performed for bus devices on one of a first and second dynamically configurable bus experiencing a configuration event.

* * * * *